United States Patent [19]

Okada et al.

[11] Patent Number: 4,739,007

[45] Date of Patent: Apr. 19, 1988

[54] COMPOSITE MATERIAL AND PROCESS FOR MANUFACTURING SAME

[75] Inventors: Akane Okada; Yoshiaki Fukushima; Masaya Kawasumi; Shinji Inagaki; Arimitsu Usuki; Shigetoshi Sugiyama; Toshio Kurauchi; Osami Kamigaito, all of Aichi, Japan

[73] Assignee: Kabushiki Kaisha Toyota Chou Kenkyusho, Aichi, Japan

[21] Appl. No.: 909,472

[22] Filed: Sep. 19, 1986

[30] Foreign Application Priority Data

Sep. 30, 1985 [JP] Japan .................................. 60-217396
Apr. 24, 1986 [JP] Japan .................................. 61-95780

[51] Int. Cl.$^4$ ............................................... C08K 3/34
[52] U.S. Cl. .................................... 524/789; 523/216; 524/791
[58] Field of Search ............... 524/789, 791, 606, 879; 523/216

[56] References Cited

U.S. PATENT DOCUMENTS 3,372,137  3/1968  Tierney ............................. 524/789
3,883,469  5/1975  Brassat ............................. 524/789

OTHER PUBLICATIONS

Bennett, Concise Chemical and Technical Dictionary, 4th ed., Chemical Publishing Co., 1986, pp. 325 and 391.
Kirk–Othmer, Encyclopedia of Chemical Technology, vol. 6, 1979, John Wiley & Sons, pp. 190–192, 197 and 198.

Primary Examiner—Lewis T. Jacobs
Attorney, Agent, or Firm—Oblon, Fisher, Spivak, McClelland & Maier

[57] ABSTRACT

Composite material with high mechanical strength and excellent high-temperature characteristics comprising a polymer matrix containing polyamide and layers of a silicate uniformly dispersed in the order of molecules in the polymer matrix, each of said silicate layers being 7 to 12 Å thick and the interlayer distance being at least 20 Å; and a process for manufacturing such composite material.

27 Claims, No Drawings

COMPOSITE MATERIAL AND PROCESS FOR MANUFACTURING SAME

BACKGROUND OF THE INVENTION

1. Field of the Invention

This invention relates to composite material with high mechanical strength and excellent high-temperature characteristics. More particularly, it relates to composite material comprising a polymer matrix containing polyamide and layers of a silicate that constitute a clay mineral, said polymer matrix and layers of a silicate being bonded together and uniformly dispersed.

2. Description of the Prior Art

It has been widely attempted to admix inorganic materials, such as calcium carbonate and clay minerals (e.g. mica), to organic polymer materials in order to improve the mechanical properties of the latter. Admixture of these inorganic additives to a polymeric material, however, brings about many disadvantages, such as embrittlement of the polymer, because of the extremely weak interaction between additive and matrix polymer. The amount of inorganic materials that can be admixed is also very limited. Techniques are known in which these inorganic materials are previously treated with a silane coupling agent or the like to ensure higher affinity to matrix polymer. In this case, however, the organic and inorganic materials are present in separate phases and uniform dispersion of the latter cannot be expected. The result is insufficient reinforcing effect and limited improvement in high-temperature characteristics.

In order to overcome these problems, we formerly filed "Resinous Composition Containing Polyamide" (Japanese Laid-Open Patent Publication No. 83551/1982), which comprises a polymer matrix containing polyamide and flakes of vermiculite with an aspect ratio not smaller than 5 dispersed in said polyamide. This was intended to improve the mechanical strength of organic polymer materials by addition of vermiculite flakes with a large aspect ratio (length/thickness ratio of a particle). The resinous compositions obtained by this method show improved mechanical strength compared with conventional resins, but the difficulties are that sufficiently large aspect ratios cannot be achieved because mechanical crushing is indispensable to obtain flakes of vermiculite, and that a large amount of additive must be used to achieve necessary strength at the risk of embrittlement, because of the weak intermolecular bonding force between the mineral layer and matrix polymer.

Attempts have already been made to produce composite materials by synthesizing a polymer, such as polyamide and polystyrene, in the space between layers of a clay mineral. With conventional techniques, however, it has been difficult for the chains of synthesized organic polymer to fully penetrate between layers of clay mineral; hence, swelling of the interlayer space in the clay mineral is limited, resulting in imperfect dispersion of the silicate layers into organic matrix. This also entails a reduction in aspect ratio of the clay mineral, thus adversely affecting the effect of enhancing mechanical strength. In addition, the bonding between interlayer compound and matrix polymer is not sufficiently high. Consequently, satisfactory reinforcement cannot be achieved by this method.

The polyamides obtained in any of the above-mentioned methods have broad molecular weight distribution—the ratio of weight average molecular weight to number average molecular weight ($M_w/M_n$) is 6 or larger.

For some vinyl compounds, it is possible to prepare polymers of narrow molecular weight distribution by the living anion polymerization or by the group-transfer polymerization (Journal of the American Chemical Society 1983, 105, p. 5706). But these techniques are not applicable to polyamide.

Under the circumstances, we have continued systematic studies to solve the problems stated above, and succeeded in accomplishing this invention.

SUMMARY OF THE INVENTION

Accordingly, it is an object of the present invention to provide new composite materials with high mechanical strengths and excellent high-temperature characteristics, and a process for manufacturing same.

It is another object of the present invention to provide new composite materials of narrow molecular weight distribution, and a process for manufacturing same.

The composite material of this invention comprises a polymer matrix containing polyamide and layers of a silicate uniformly dispersed in the order of magnitude of molecular dimensions in said polymer matrix, each of said silicate layers being 7 to 12 Å thick and the interlayer distance being at least 20 Å, and has high mechanical strength and excellent high-temperature characteristics.

The composite materials according to one aspect of this invention comprise a polymer matrix containing polyamide and layers of a silicate uniformly dispersed in the order of magnitude of molecular dimensions in said polymer matrix, each of said silicate layers being 7 to 12 Å thick, the interlayer distance being at least 30 Å, and said silicate layers combining with part of said polyamide chain through ionic bonding. These materials have exceptionally high mechanical strength and excellent high-temperature characteristics.

The composite materials according to another aspect of this invention comprise a polymer matrix containing polyamide and layers of a silicate uniformly dispersed in the order of magnitude of molecular dimensions in said polymer matrix, each of said silicate layers being 7 to 12 Å thick, the interlayer distance being at least 20 Å, and the molecular weight distribution of said polyamide expressed by the ratio of its weight average molecular weight ($M_w$) to its number average molecular weight ($M_n$) being 6 or smaller. These materials have exceptionally high mechanical strength and excellent high-temperature characteristics, and the molecular weight distribution of the polyamide contained is very narrow.

The process for manufacturing composite material of this invention comprises the following steps: (1) bringing a swelling agent into contact with a clay mineral having a cation-exchange capacity of 50 to 200 milliequivalent/100 g to form a complex that can be swollen by a polyamide monomer at a temperature higher than the melting point of that monomer; (2) mixing said complex with said polyamide monomer; and (3) heating the mixture obtained in step (2) to a prescribed temperature to effect polymerization.

The process of this invention, which involves the three steps as shown above, gives highly reinforced composite materials with high mechanical strength and excellent high-temperature characteristics, and is also cost-effective because no subsequent treatment for reinforcement (e.g., remelting after polymerization) is required.

The process of this invention may use, in the mixing step, a base catalyst and an activator, and is also capable of producing composite materials with a narrow molecular weight distribution.

The process of this invention not only gives composite materials with superb characteristics as stated above, but also eliminates some of the steps indispensable in conventional manufacturing processes.

DETAILED DESCRIPTION OF THE INVENTION

Composite material of this invention will be explained below.

The polymer matrix in the composite material of this invention is a resin containing polyamide, namely, a polyamide or a mixture thereof with other polymers. The polyamide herein means any polymer containing amide bonds (—CONH—), for example, nylon-66, nylon-6 and nylon 11. The greater the proportion of polyamide in the polymer matrix, the more marked will be the effects achieved by this invention; however, the effects of this invention are still apparent even when the proportion of polyamide is 10 wt%.

The layers of silicate in the composite material of this invention, which are intended to impart the polymeric material with high mechanical strength and excellent high-temperature characteristics, are layers of aluminum or magnesium phyllosilicate b 7 to 12 Å in thickness. These phyllosilicate are negatively charged (as a result of isomorphic ion exchange or the like), and show different characteristics depending on the density and distribution of the negative charges. For the purpose of this invention, it is preferable to use silicate layers in which the area occupied by each of the negative charges is in the range from 25 to 200 Å. The composite materials of this invention comprise a polymer matrix containing polyamide as described above and above-stated silicate layers dispersed uniformly in the order of magnitudue of molecular dimensions in said polymer matrix, each of said silicate layers being 7 to 12 Å thick and the interlayer distance being at least 20 Å.

The amount of silicate layers dispersed in said polymer matrix is preferably in the range from 0.5 to 150 parts by weight per 100 parts by weight of the polymer matrix. If this amount is less than 0.5 parts, a sufficient reinforcing effect cannot be expected. If the amount exceeds 150 parts, on the other hand, the resulting product is powdery interlayer compound which cannot be used as moldings.

In addition, it is also preferable that the composite material of this invention be such that the interlayer distance is at least 30 Å and that the silicate layers combine with part of the polyamide chain through ionic bonding. The greater the interlayer distance, the better the mechanical strength aand high-temperature characteristics. In this case, the negatively charged silicate layers combine, through ionic bonding, with ammonium ion (—NH$_3^+$) or trimethylammonium ion (—N$^+$(CH$_3$)$_3$), or with cations expressed by —NX$^+$, in which X is H, Cu or Al, (formed by reaction of polyamide monomer and inorganic molecules). These cations are attached to the main chain or side chains of polyamide through covalent bonding.

In the composite material of this invention, it is preferable that the molecular weight distribution of polyamide contained be 6 or smaller when expressed by the ratio of its weight average molecular weight ($M_w$) to its number average molecular weight ($M_n$).

Next, the process for manufacturing composite material of this invention is described below.

The first step is to bring a swelling agent into contact with a clay mineral having a cation-exchange capacity of 50 to 200 milliequivalent per 100 g of the clay mineral, thereby adsorbing said swelling agent on said clay mineral and forming a complex that can be swollen by a polyamide monomer at temperature higher than the melting point of that monomer.

This can be accomplished by immersing said clay mineral in an aqueous solution containing said swelling agent, followed by washing the treated clay mineral with water to remove excess ions, or by mixing an aqueous suspension of said clay mineral with a cation-exchange resin previously treated with said swelling agent, thereby effecting ion-exchange operation.

The clay mineral used in this invention is any clay mineral (both natural and synthesized) having a cation-exchange capacity of 50 to 200 milliequivalent/100 g and a large contact area with the monomer to be used. Typical examples include smectite clay minerals (e.g., montmorillonite, saponite, beidellite, nontronite, hectorite and stevensite), vermiculite and halloysite. With a clay mineral whose cation-exchange capacity exceeds 200 milliequivalent/100 g, its interlayer bonding force is too strong to give intended composite materials of this invention. If the capacity is less than 50 milliequivalent/100 g, on the other hand, ion exchange or adsorption of swelling agent (comprising organic or inorganic cations), which is an essential step in the process of this invention, will not be sufficient, making it difficult to produce composite materials as intended by this invention. It is preferable to grind the clay mineral before use into a desired shape and size by means of a mixer, ball mill, vibrating mill, pin mill or jet mill.

In the process of this invention, ion-exchange is essential because interlayer or exchangeable cations usually existing in natural and synthesized clays, such as Na$^+$, Ca$^{2+}$, K$^+$ and Mg$^{2+}$, are not suitable and should be exchanged with other cations for the purpose of the invention.

The swelling agent serves to expand the interlayer distance in a clay mineral, thus facilitating the intake of polymer between the silicate layers, and is at least one inorganic ion, such as copper ion (Cu$^{2+}$), hydrogen ion (H$^+$) and aluminum ion (Al$^{3+}$), or at least one organic cation, for example, 12-amino-dodecanoic acid ion (H$_3$N$^+$C$_{12}$H$_{24}$COOH) and dodecylammonium ion (H$_3$N$^+$C$_{12}$H$_{25}$).

If, in this case, a base catalyst and an activator are not added in the subsequent mixing step, the organic cation should preferably be a cation containing carboxyl group. Such carboxyl-containing organic cations are those represented by X$^+$—R—COOH, wherein X$^+$ stands for ammonium ion (NH$_3^+$) or trimethylammonium ion (13 N$^+$(CH$_3$)$_3$), and R denotes an alkylene group which may contain phenylene

vinylene (—CH=CH—), branching

and other linkages. Typical examples include 4-amino-n-butyric acid ion ($NH_3{}^+C_3H_6COOH$), 6-amino-n-capronic acid ion ($NH_3{}^+C_5H_{10}COOH$), ω-aminocaprylic acid ion ($NH_3{}^+C_7H_{14}COOH$), 10-amino-decanoic acid ion ($NH_3{}^+C_9H_{18}COOH$), 12-amino-dodecanoic acid ion ($NH_3{}^+C_{11}H_{22}COOH$), 14-amino-tetradecanoic acid ion ($NH_3{}^+C_{13}H_{26}COOH$), 16-amino-hexadecanoic acid ion ($NH_3{}^+C_{15}H_{30}COOH$) and 18-amino-octadecanoic acid ion ($NH_3{}^+C_{17}H_{34}COOH$). These are used either alone or in combination.

The clay minerals with these ions exchanged thereupon as described above have catalytic activity for ring-opening polymerization of lactams (e.g., ε-caprolactam) and are also capable of taking in the polyamides thus formed, or the polyamides produced by dehydrative condensation of amino acids or nylon salts, between silicate layers. Use of such ion-exchanged clay mineral does enable the manufacture of the super-dispersed composite materials of this invention. In the polymerization of polyamide monomer, inorganic ions form $Cu.HN^+-$ or $H_3N^+-$ cations, which unite with the clay through ionic bonding, on the one hand, and with the polymer chain through amide linkage, on the other. Such effects cannot be expected from surface-active agents commonly used for lipophilic surface treatment of clay minerals, which lack in the ability to initiate polymerization, to take in the polyamide formed between silicate layers, and to unite with the organic polymer chain.

The carboxyl-containing organic cation should preferably have a size of about 120 to 500 $Å^2$ (as projected area) in order to (1) take in the lactam compound, (2) suppress evaporation of the lactam, and (3) ensure sufficient reinforcing effect of clay mineral. This range of size corresponds to $12 \leq n \leq 20$ when R is $-(CH_2)_n-$. When $n<11$, the treated clay mineral will not readily coagulate from aqueous phase, making filtration and washing very difficult. In addition, hygroscopic property of the surface of clay mineral is insufficient, and lactam molecules fail to fully penetrate between silicate layers. If $n>20$, on the other hand, the swelling agent will be sparingly soluble in water, making ion-exchange very difficult.

Such inorganic and organic cations as described above are capable of taking in the molecules of polyamide monomer between the silicate layers of clay mineral, initiating ring-opening polymerization of lactams, and also taking in the polymers formed as the polymerization proceeds. The reason why such cations specifically have such abilities is not clear yet. However, one may deduce that, in the case with the organic ions, their large size may help expand the interlayer space to a considerable extend and the interaction between the carboxyl group in these ions and the amino groups on the polyamide monomer may contribute to efficient intake of the monomer molecules between the expanded layer space. Probably the same is true with $Cu^{2+}$, $Al^{2+}$ and $H^+$; these ions are also considered to have high ability to take in the monomers between silicate layers, thereby expanding the interlayer space before the start of polymerization and reducing the interlaminar cohesive force.

When a base catalyst and an activator are used in the subsequent mixing step, it is preferable to employ, as the swelling agent, ions derived from an organic compound that will not retard the polymerization (e.g., ions derived from hydrocarbons, amines, carboxylic acids, alcohols and halogenated compounds); particularly preferable are compounds containing in the molecule onium ions which are capable of forming a firm chemical bond with silicates through cation-exchange reaction. Typical examples of such compounds include strong acid salts of trimethylamine, triethylamine, hexylamine, cyclohexylamine, dodecylamine, aniline, pyridine, benzylamine, bis(aminomethyl)benzene, aminophenols, ethylenediamine, hexamethylenediamine, hexamethylenetetramine, polyallylamine, alanine, 4-amino-butyric acid, 6-amino-caproic acid, 12-amino-dodecanoic acid and 16-amino-hexadecanoic acid. Examples of the strong acids are hydrochloric, hydrobromic, sulfuric and phosphoric acids.

The second step in the process of this invention is to mix a polyamide monomer with the complex obtained in the first step.

The polyamide monomer used in this step is a material which will form the matrix polymer in the composite materials of this invention. Illustrative examples include amino acids such as 6-amino-n-caproic acid and 12-amino-dodecanoic acid, nylon salts such as hexamethylenediamine adipate, and lactams such as ε-caprolactam and caprylolactam.

Mixing of the complex and polyamide monomer is effected by using a power-driven mortar, vibration mill or the like.

If a polyamide of narrow molecular weight distribution is to be obtained, it is preferable to further add a base catalyst and an activator in this mixing step. In this case, the monomer should preferably be a lactam. Lactams are cyclic compounds represented by formula [A] shown below, which undergo ring-opening polymerization to form polyamides,

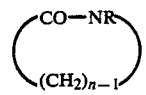 [A]

(wherein n is an integer of 6 to 12, and R stands for hydrogen, an alkyl of 1 to 8 carbon atoms, or an aralkyl which may optionally has substituent groups). Illustrative examples include caprolactam (n=6 and R=H in formula [A]), caprylolactam (n=8 and R=H in formula [A]) and dodecanolactam (n=12 and R=H in formula [A]), which form upon polymerization nylon-6, nylon-8 and nylon-12, respectively. These polymerizable lactams may be used either alone or in combination.

The addition of a base catalyst and an activator is to cause anion polymerization of lactams to take place. The types and amounts of said catalyst and accelerator are the same as in common anion polymerization of polymerizable lactams [refer, for example, to p457 of "NYLON PLASTICS" edited by M. I. Kohan (1973), Interscience]. Typical examples of the base catalyst include sodium hydride, sodium methoxide, sodium hydroxide, sodium amide and potassium salts of lactams. These base catalysts may be used either alone or in combination, and the suitable amount to be employed is in the range from 0.01 to 10 mol% of polymerizable lactam. The rate of polymerization is too low if the amount is less than 0.01 mol%; when the amount exceeds 10 mol%, on the other hand, the molecular weight of resultant polyamide is unlikely to be sufficiently high.

The accelerator acts to react with the base catalyst to form an active intermediate that can initiate anionic polymerization. Illustrative examples include N-acetylcaprolactam, acetic anhydride, carbon dioxide, phenyl isocyanate and cyanuric chloride. These may be used either alone or in combination. The preferable amount to be used is in the range from 0.01 to 5 mol% of polymerizable lactam. The rate of polymerization is too low if the amount is less than 0.01 mol%; when the amount exceeds 5 mol%, on the other hand, the molecular weight of resultant polyamide is unlikely to be sufficiently high.

The final step is to polymerize the mixture obtained in the mixing step above by heating it to a prescribed temperature, thereby giving an intended composite material of this invention (polymerization step). The mixture obtained in the mixing step may be immediately heated to cause polymerization. However, the better way is to keep the mixture at a temperature slightly above the melting point of the polyamide monomer for a certain period of time to ensure even dispersion of the clay mineral in the monomer.

When no base catalyst and accelerator are used in the preceding mixing step, polymerization proceeds in the cationic mode, with the swelling agent present in the system acting as catalyst.

This type of polymerization can be carried out in the temperature range from 200° to 300° C., but a temperature between 250° and 300° C. is preferable for rapid progress of polymerzation. Suitable polymerization time, though different depending on the type of swelling agent and polymerization temperature, is preferably in the range from 5 to 24 hours. To be more specific, polymerization at 250° C. can be put to completion in about five hours when an organic ion is used as swelling agent, but it requires 10 to 24 hours for completion when an inorganic ion is used.

When a polyamide of narrow molecular weight distribution is to be prepared by the use of a base catalyst and an accelerator, the anion polymerization may be effected under conditions commonly adopted. The reaction proceeds very rapidly in the temperature range between 80° to 300° C., but a temperature in the range from 120° to 250° C. is most preferred. Suitable polymerization time varies with the polymerization temperature adopted, but should be in the range from one minute to five hours. When the reaction is carried out at a temperature in the range from 120° to 250° C., it should best be continued for 5 to 60 minutes.

In the process of this invention, additives that are substantially inert to the polymerization reaction, such as glass fiber, pigment and antioxidants, may also be added to the system.

The composite materials obtained according to the procedure detailed above may be directly injection-molded or compression-molded (at elevated temperatures), or may be mixed with polyamides or other types of polymers before molding. Alternatively, moldings can be obtained by conducting the polymerization step inside a desired mold. One may further add, in the polymerization step, other types of catalysts, such as phosphoric acid and water.

The reasons why the composite materials of this invention have distinctive properties are not absolutely clear yet, but the following deductions may be drawn.

In the composite materials of this invention, the crosslinking by chemical bonds between polyamide molecules and silicate layers firmly resists thermal and mechanical deformation, and this is reflected in their high mechanical strengths (e.g., tensile strength and modulus of elasticity) and excellent thermal characteristics (e.g., high softening point and high-temperature strengths); their high dimensional stability, abrasion resistance, surface slipperiness, water permeability and water resistance come from the uniform dispersion of silicate layers; and embrittlement and other troubles, unavoidable in conventional composite materials containing inorganic additives, are eliminated because the silicate layers are finely dispersed in the order of magnitude of molecular dimensions (in a thickness of 10 Å or so) and are firmly combined with the chains of organic molecules.

The process of this invention, which involves only three steps (contact, mixing and polymerization), gives highly reinforced composite materials having high mechanical strengths and excellent high-temperature characteristics. In addition, the process of this invention eliminates some of the steps indispensable in conventional manufacturing processes, such as a treatment for reinforcement (e.g., remelting after polymerization), and is hence very cost-effective.

To be more specific, the process of this invention features: (1) elimination of steps for surface treatment and mixing of mineral materials, because composite-material formation progresses in the polymerization step; (2) simplified crushing and mixing of clay minerals, and no danger of aspect ratio being reduced due to excessive crushing, because a chemical reaction is utilized for dispersion of silicate layers; and (3) high storage stability of mixtures of clay mineral with polyamide monomer or polyamide because of inertness of clay mineral to the monomer and polymer.

When no base catalyst and activator are added in the mixing step, the clay mineral with ions exchanged thereon acts as an initiator for polymerization of polyamide monomers (e.g., polymerizable lactams), thus eliminating the need for adding a new catalyst or for a step of ring-opening reaction to form an amino acid.

When a base catalyst and activator are added in the mixing step, an interaction between the base catalyst and the silicate seems to make the molecular weight distribution of resultant polyamide narrower. Furthermore, composite materials of silicate of polyamide can be produced very rapidly by the process of this invention.

DETAILED DESCRIPTION OF THE PREFERRED EMBODIMENTS

Some examples of the invention will now be described.

EXAMPLE 1

Complexes were prepared using montmorillonite (product in Japan; cation-exchange capacity: 100 milliequivalent/100 g) as clay mineral and substances listed in Table 1 as swelling agent, which was followed by polymerization of ε-caprolactam to make composite materials.

In the first place, an inorganic or organic cation (listed in Table 1 as swelling agent) was exchanged with $Na^+$ or $Ca^+$ in the montmorillonite. When aluminum ion ($Al^{3+}$) was used as swelling agent, ion exchange was conducted by first adsorbing this ion on an ion-exchange resin, packing the treated resin in a column, and flowing an aqueous suspension of montmorillonite through that column over and over again. For the other swelling agents, ion exchange was effected by immersing 10 g of montmorillonite in one liter of aqueous solution containing the chloride of the cation to be exchanged (concentration: 1N), followed by repeated filtration (Buchner funnel) and washing with water.

lane and 100 g of nylon-6, followed by injection molding (C4); and a sample made of plain nylon-6.

It is apparent from Table 2 that the composite materials of this invention have better mechanical strengths and high-temperature characteristics than the comparative materials.

TABLE 1

| Sample No. | Swelling Agent | Proportion (g) Montmorillonite | Proportion (g) Caprolactam | Test Result Yld. of Polyamide (%) | Test Result Interlayer Distance (Å) |
|---|---|---|---|---|---|
| Present Invention | | | | | |
| 1 | $Cu^{2+}$ | 0.5 | 100 | 100 | $\geq 100$ Å |
| 2 | $Cu^{2+}$ | 10 | 100 | 100 | $\geq 100$ Å |
| 3 | $Cu^{2+}$ | 25 | 100 | 100 | $\geq 100$ Å |
| 4 | $Cu^{2+}$ | 50 | 100 | 100 | 60 Å |
| 5 | $Cu^{2+}$ | 100 | 100 | 100 | 35 Å |
| 6 | $Cu^{2+}$ | 150 | 100 | 100 | 30 Å |
| 7 | $Al^{3+}$ | 25 | 100 | 100 | $\geq 100$ Å |
| 8 | $H^+$ | 25 | 100 | 100 | $\geq 100$ Å |
| 9 | $NH_3^+(CH_2)_5COOH$ | 25 | 100 | 100 | $\geq 100$ Å |
| 10 | $NH_3^+(CH_2)_{11}COOH$ | 25 | 100 | 100 | $\geq 100$ Å |
| 11 | $NH_3^+(CH_2)_{11}COOH$ | 10 | 100 | 100 | $\geq 100$ Å |
| 12 | $NH_3^+(CH_2)_{17}COOH$ | 25 | 100 | 100 | $\geq 100$ Å |
| Comp. | | | | | |
| C1 | $Na^+$ | 25 | 100 | 5 | 15 Å |
| C2 | $Mg^{2+}$ | 25 | 100 | 60 | 16 Å |
| C3 | $NH_3(CH_2)_{17}CH_3$ | 25 | 100 | 0 | 29 Å |

TABLE 2

| Sample No. | Tensile Strength (Kg/mm²) | Elongation (%) | Tensile Modulus (Kg/mm²) | Heat Distortion Point (°C.) | Dynamic Modulus (dyne/cm²)* | Water Absorption (%) |
|---|---|---|---|---|---|---|
| Inv. | | | | | | |
| 11 | 13.00 | 10.0 | 333 | 120 | $17.5 \times 10^9$ | 0.50 |
| Comp. | | | | | | |
| C4 | 8.02 | 6.0 | 280 | 90 | $7.3 \times 10^9$ | 0.90 |
| C5 | 7.75 | $\geq 210$ | 177 | 65 | $4.9 \times 10^9$ | 0.87 |

(*at 120° C.)

The ion-exchanged montmorillonite thus obtained was mixed in a mortar with ε-caprolactam in a given proportion, the mixture was placed in an aluminum container and heated at 80° C. for three hours to ensure dehydration and melting of the caprolactam for homogenization, and the homogeneous complex thus prepared was then transferred to a closed vessel made of stainless steel and heated at 250° C. for five hours, giving a composite material. It was heated at a rate of 2° C./min in a DSC (differential scanning calorimeter) to measure the heat of fusion, and the yield of polyamide in the product was estimated from this data. The degree of dispersion in the product was estimated from the interlayer distance of silicate measured by X-ray diffraction. The results are summarized in Table 1.

No. 11 composite material was injection-molded to prepare specimens, which were subjected to a tensile test (ASTM D 638M). The result is shown in Table 2, together with its heat distortion temperature, dynamic modulus of elasticity at 120° C., and water absorption (after 24 hour's immersion in 20° C. water).

Comparative samples (No. C1 through C3) were prepared in the same manner as above, except that sodium ion ($Na^+$), magnesium ion ($Mg^{2+}$) or a surface-active agent, $NH_3^+(CH_2)_{17}CH_3$, was used, respectively, in place of the swelling agents. The result is also shown in Table 1.

Table 2 also shows the test result of two comparative samples (No. C4 and C5): a sample prepared by kneading 10 g of montmorillonite pretreated with an aminosi-

EXAMPLE 2

Vermiculite (product in China; cation-exchange capacity: 180 milliequivalent/100 g) was ground in a vibrating ball mill (using steel balls) and treated with 12-amino-dodecanoic acid ion, $NH_3^+(CH_2)_{11}COOH$, in the same manner as in Example 1. The treated vermiculite powder thus obtained (25 g) was mixed with hexamethylenediamine adipate (200 g), and the mixture was heated at 230° C. for five hours in a nitrogen gas stream, giving a composite material.

This material showed no peak corresponding to interlayer distance when measured by ordinary X-ray diffraction (actual interlayer distance: more than 100 Å), indicating even distribution of vermiculite layer.

EXAMPLE 3

Montmorillonite (product in Japan; cation-exchange capacity: 80 milliequivalent/100 g) was treated with 12-amino-dodecanoic acid ion, $NH_3^+(CH_2)_{11}COOH$, in the same manner as in Example 1. The treated montmorillonite powder thus obtained (50 g) was mixed with 12-amino-dodecanoic acid $NH_2(CH_2)_{11}COOH$ (50 g), and the mixture was heated at 240° C. for ten hours in a nitrogen gas stream, giving a composite material. The interlayer distance of this materials proved to be more than 100 Å when measured in the same way as in Example 2.

EXAMPLE 4

To a suspension of 100 g montmorillonite ("Kunipia F"; Kunimine Industries, Inc.) in 10 liters of water, were added 51.4 g 12-amino-dodecanoic acid and 24 ml concentrated hydrochloric acid, and the mixture was stirred for five minutes. After filtration, the solid matters collected were thoroughly washed with water and vacuum-dried, affording montmorillonite exchanged with 12-amino-dodecanoic acid ions (hereinafter abbreviated as "12-M").

ε-Caprolactam (100 g) and 12-M (10 g) were placed in a reactor fitted with a stirrer, and the mixture was heated at 100° C. with stirring, giving a highly viscous, homogeneous suspension. Sodium hydride (2.4 g) was then added, the temperature was raised to 160° C., N-acetylcaprolactam (1.37 g) was further added as activator, and heating was continued at 160° C. for 30 minutes to complete polymerization.

The cruded polymer thus obtained was crushed, washed with hot water, and vacuum-dried. The dried polymer was easily dissolved in m-cresol to a concentration of 0.25 weight %, and the solution was subjected to GPC (gel permeation chromatography) at 100° C. to measure $M_w/M_n$ and $M_n$. Interlayer distance of silicate layers was determined by X-ray diffraction. These results are shown in Table 3. The interlayer distance of 12-M was 16 Å.

EXAMPLE 5

A composite material was prepared in the same manner as in Example 4, except that 5 g of 12-M was used. The results are also shown in Table 3.

EXAMPLE 6

A composite material was prepared in the same manner as in Example 5, except that polymerization was conducted at 225° C. The results are shown in Table 3.

EXAMPLE 7

A composite material was prepared in the same manner as in Example 1, except that 27.6 g of hexamethylenediamine was used in place of 12-amino-dodecanoic acid in Example 4 and that 5 g of montmorillonite was employed. The results are also shown in Table 3.

COMPARATIVE EXAMPLE 1

A composite material was prepared in the same manner as in Example 4, except that no 12-M was used. The results are shown in Table 3.

COMPARATIVE EXAMPLE 2

This is a case in which ε-caprolactam was polymerized in the absence of base catalyst and activator (utilizing the silicate as polymerization initiator).

A mixture of 12-M (5 g) and ε-caprolactam (100 g) was stirred at 100° C., the resulting viscous, homogeneous suspension was heated at 250° C. for 96 hours to complete polymerization of caprolactam, and the polymer thus obtained was after-treated and tested in the same manner as in Example 4. The results are shown in Table 3.

A sample taken out during polymerization (48 hours after the start of polymerization) showed $M_n$ as low as $1.2 \times 10^4$, indicating extremely low rate of polymerization.

COMPARATIVE EXAMPLE 3

This presents the data for commercial nylon-6 ("Amilan CM1017"; Toray Industries).

In Table 3, the amounts of 12-M and base catalyst are weight % based on polymerizable lactam. The 12-M in Example 7 is montmorillonite exchanged with hexamethylenediamine ions.

TABLE 3

| | Polymn. Temp. (°C.) | Polymn. Time (hr) | Amt. of 12-M | Amt. of Base Cat. | $M_w/M_n$ | $M_n$ ($\times 10^4$) | Interlayer Distance (Å) |
|---|---|---|---|---|---|---|---|
| Example | | | | | | | |
| 4 | 160 | 0.5 | 10 | 2.4 | 2.9 | 2.1 | 21 |
| 5 | 160 | 0.5 | 5 | 2.4 | 3.7 | 2.4 | 21 |
| 6 | 225 | 0.5 | 5 | 2.4 | 5.1 | 2.3 | >80 |
| 7 | 160 | 0.5 | 5 | 2.4 | 3.7 | 2.1 | 21 |
| Comp. | | | | | | | |
| 1 | 160 | 0.5 | 0 | 2.4 | 6.3 | 2.1 | — |
| 2 | 250 | 96 | 5 | 0 | 15.3 | 2.3 | >80 |
| 3 | — | — | — | — | 7.0 | 2.5 | — |

As can be seen from Table 3, polyamides of narrower molecular weight distribution were obtained in Examples 4 through 7.

What is claimed is:

1. Composite material with high mechanical strength and excellent high-temperature characteristics comprising a polymer matrix containing polyamide and a phyllosilicate uniformly dispersed in said polymer matrix, the phyllosilicate layers of said dispersed phyllosilicate being 7 to 12 Å thick and the interlayer distances of said phyllosilicate layers in the dispersed phyllosilicate being at least 20 Å, and the amount of said phyllosilicate layers being 0.5 to 150 parts by weight per 100 parts by weight of said polymer matrix.

2. Composite material as defined in claim 1, wherein said phyllosilicate is aluminum or magnesium phyllosilicate.

3. Composite material as defined in claim 1, wherein the interlayer distances of said phyllosilicate layers are at least 30 Å and said phyllosilicate layers are combined with part of chains of said polyamide through ionic bonding.

4. Composite material as defined in claim 3, wherein said phyllosilicate layers are negatively charged and form ionic bonds with positively charged groups arranged on part of said polyamide in said polymer matrix, the area occupied by each of the negative charges on said phyllosilicate layers being in the range from 25 to 200 Å$^2$.

5. Composite material as defined in claim 3, wherein part of said polyamide in said polymer matrix carries ammonium ion ($-NH_3^+$), trimethylammonium ion ($-N^+(CH_3)_3$), or cations expressed by $-NX^+$, in which X is at least one member selected from hydrogen (H), copper (Cu) and aluminum (Al).

6. Composite material as defined in claim 1, wherein the molecular weight distribution of said polyamide expressed by the ratio of its weight average molecular weight ($M_w$) to its number average molecular weight ($M_n$) is 6 or smaller.

7. Composite material as defined in claim 6, wherein said phyllosilicate layers are negatively charged and the area occupied by each of the negative charges is in the range from 25 to 200 Å$^2$.

8. A process for manufacturing composite material with high mechanical strength and excellent high-temperature characteristics comprising the steps of bringing a swelling agent into contact with a clay mineral having a cation-exchange capacity of 50 to 200 milliequivalent per 100 g of said clay mineral to form a complex capable of being swollen by a polyamide monomer at a temperature higher than the melting point of said monomer, mixing said complex with said polyamide monomer, and heating the mixture obtained in said mixing step to a prescribed temperature to effect polymerization.

9. The process for manufacturing composite material as defined in claim 8, wherein said clay mineral is a smectite or vermiculite.

10. The process for manufacturing composite material as defined in claim 8, wherein said swelling agent is an organic cation having a carboxyl group.

11. The process for manufacturing composite material as defined in claim 10, wherein said swelling agent is at least one member selected from 12-amino-dodecanoic acid ion, 14-amino-tetradecanoic acid ion, 16-amino-hexadecanoic acid ion and 18-amino-octadecanoic acid ion.

12. The process for manufacturing composite material as defined in claim 8, wherein said swelling agent is at least one member selected from the group consisting of the aluminum ion, the hydrogen ion and the copper ion.

13. The process for manufacturing composite material as defined in claim 8, wherein said polyamide monomer is a lactam.

14. The process for manufacturing composite material as defined in claim 13, wherein said lactam is ε-caprolactam.

15. The process for manufacturing composite material as defined in claim 8, wherein said polyamide monomer is an amino acid.

16. The process for manufacturing composite material as defined in claim 15, wherein said amino acid is 6-amino-n-caproic acid or 12-amino-dodecanoic acid.

17. The process for manufacturing composite material as defined in claim 8, wherein said polyamide monomer is a nylon salt.

18. The process for manufacturing composite material as defined in claim 17, wherein said nylon salt is hexamethylenediamine adipate.

19. The process for manufacturing composite material as defined in claim 8, wherein a base catalyst and an activator are further added in said mixing step.

20. The process for manufacturing composite material as defined in claim 19, wherein said base catalyst is one member selected from the group consisting of sodium hydride, sodium methoxide, sodium hydroxide, sodium amide and potassium salt of a lactam.

21. The process for manufacturing composite material as defined in claim 19, wherein said activator is one member selected from the group consisting of N-acetylcaprolactam, acetic anhydride, carbon dioxide, phenyl isocyanate and cyanuric chloride.

22. The process for manufacturing composite material as defined in claim 19, wherein said clay mineral is a smectite or vermiculite.

23. The process for manufacturing composite material as defined in claim 19, wherein said swelling agent is an organic cation.

24. The process for manufacturing composite material as defined in claim 23, wherein said organic cation is a compound having an onium ion in the molecule.

25. The process for manufacturing composite material as defined in claim 19, wherein said polyamide monomer is a lactam.

26. The process for manufacturing composite material as defined in claim 25, wherein said lactam is a compound represented by the following formula

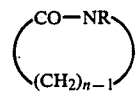

wherein n is an integer of 6 to 12, and R stands for hydrogen, and alkyl of 1 to 8 carbon atoms, or an aralkyl.

27. The process for manufacturing composite material as defined in claim 26, wherein said lactam is caprolactam, caprylolactam or dodecanolactam.

* * * * *

UNITED STATES PATENT AND TRADEMARK OFFICE
CERTIFICATE OF CORRECTION

PATENT NO. : 4,739,007
DATED : Apr. 19, 1988
INVENTOR(S) : Akane Okada, et al.

It is certified that error appears in the above-identified patent and that said Letters Patent is hereby corrected as shown below:

On the Title Page:

--[73] Assignee: Kabushiki Kaisha Toyota Chuo Kenkyusho, Aichi, Japan--

Signed and Sealed this

Thirteenth Day of December, 1988

*Attest:*

DONALD J. QUIGG

*Attesting Officer*  *Commissioner of Patents and Trademarks*